(12) United States Patent
Deschamps et al.

(10) Patent No.: US 10,934,082 B2
(45) Date of Patent: Mar. 2, 2021

(54) RING FOR FLUID PRODUCT DISPENSING DEVICE

(71) Applicant: APTAR FRANCE SAS, Le Neubourg (FR)

(72) Inventors: Olivier Deschamps, Romilly sur Andelle (FR); Eric Piazzoni, Saint Cyr la Campagne (FR)

(73) Assignee: APTAR FRANCE SAS, Le Neubourg (FR)

( * ) Notice: Subject to any disclaimer, the term of this patent is extended or adjusted under 35 U.S.C. 154(b) by 134 days.

(21) Appl. No.: 16/096,821

(22) PCT Filed: May 11, 2017

(86) PCT No.: PCT/FR2017/051130
§ 371 (c)(1),
(2) Date: Oct. 26, 2018

(87) PCT Pub. No.: WO2017/194887
PCT Pub. Date: Nov. 16, 2017

(65) Prior Publication Data
US 2019/0112123 A1    Apr. 18, 2019

(30) Foreign Application Priority Data

May 13, 2016 (FR) .................................... 16 54307

(51) Int. Cl.
*B65D 83/42*    (2006.01)
*B65D 83/54*    (2006.01)
(Continued)

(52) U.S. Cl.
CPC .......... *B65D 83/425* (2013.01); *B65D 83/38* (2013.01); *B65D 83/54* (2013.01); *F16K 51/00* (2013.01)

(58) Field of Classification Search
CPC ...... B65D 83/425; B65D 83/38; B65D 83/54; B65D 83/14; B65D 83/48; F16K 51/00
(Continued)

(56) References Cited

U.S. PATENT DOCUMENTS 2,432,923 A * 12/1947 Newman .................. B67D 3/00
                                                      222/59
2,831,618 A *  4/1958 Soffer ..................... B65D 83/14
                                                      222/402.22

(Continued)

FOREIGN PATENT DOCUMENTS

DE    10 2005 002 444 A1    7/2006
EP        1 065 156 A1    1/2001
(Continued)

OTHER PUBLICATIONS

International Preliminary Report on Patentability with English Translation of the Written Opinion of PCT/FR2017/051130 dated Nov. 22, 2018.

(Continued)

*Primary Examiner* — John Bastianelli
(74) *Attorney, Agent, or Firm* — Sughrue Mion, PLLC

(57) ABSTRACT

A ring for arranging around a valve body of a fluid dispenser valve mounted by a fastener capsule on a reservoir containing fluid to be dispensed. The ring includes a single piece including at least one inner portion that co-operates with the valve body, a radial flange that forms a neck gasket between the neck of the reservoir and the fastener capsule, and at least one axial recess that extends, at least in part, around the periphery of the ring, radially inwards from the radial flange, the single piece is made out of a first material that is substantially deformable; and at insert least one filler insert that fills the at least one axial recess at least in part, the at least one filler made out of a second material that is more (Continued)

rigid than the first material, the at least one filler insert being over-molded on the single piece.

18 Claims, 3 Drawing Sheets

(51) Int. Cl.
*B65D 83/38* (2006.01)
*F16K 51/00* (2006.01)

(58) Field of Classification Search
USPC ....... 251/335.2, 331; 222/402.1–402.25, 542
See application file for complete search history.

(56) References Cited

U.S. PATENT DOCUMENTS

| | | | | |
|---|---|---|---|---|
| 3,145,011 | A * | 8/1964 | Kappel | B65D 83/48 |
| | | | | 251/349 |
| 3,180,374 | A * | 4/1965 | Muller | B65D 83/425 |
| | | | | 141/20 |
| 4,462,568 | A * | 7/1984 | Taylor | F16K 41/00 |
| | | | | 251/335.2 |
| 5,697,532 | A | 12/1997 | Wilde et al. | |
| 5,975,378 | A * | 11/1999 | Bayer | B65D 83/48 |
| | | | | 222/402.24 |
| 6,394,321 | B1 * | 5/2002 | Bayer | B65D 83/48 |
| | | | | 222/402.24 |
| 6,527,149 | B1 | 3/2003 | Garcia et al. | |
| 2002/0144678 | A1 * | 10/2002 | Warby | A61M 15/009 |
| | | | | 128/200.23 |
| 2003/0180228 | A1 * | 9/2003 | Cripps | B65D 81/266 |
| | | | | 424/46 |
| 2004/0035887 | A1 | 2/2004 | Beranger et al. | |
| 2012/0181306 | A1 | 7/2012 | Milian et al. | |
| 2014/0027475 | A1 | 1/2014 | Jacuk | |

FOREIGN PATENT DOCUMENTS

| | | |
|---|---|---|
| FR | 2 792 295 A1 | 10/2000 |
| FR | 2 840 890 A1 | 12/2003 |
| FR | 2 865 198 A1 | 7/2005 |
| JP | 2004-202410 A | 7/2004 |
| WO | 2007/074274 A1 | 7/2007 |
| WO | 2011/012804 A1 | 2/2011 |
| WO | 2012/136927 A1 | 10/2012 |

OTHER PUBLICATIONS

International Search Report of PCT/FR2017/051130 dated Aug. 21, 2017.

* cited by examiner

RING FOR FLUID PRODUCT DISPENSING DEVICE

CROSS REFERENCE TO RELATED APPLICATIONS

This application is a National Stage of International Application No. PCT/FR2017/051130 filed May 11, 2017, claiming priority based on French Patent Application No. 1654307 filed May 13, 2016.

The present invention relates to a ring for a fluid dispenser valve and to a fluid dispenser device including such a ring.

It is known to use rings with aerosol dispenser valves, in particular metering valves that are mounted on a reservoir containing the fluid to be dispensed. In particular, such rings are used in valves that are suitable for use upsidedown, i.e. with the valve arranged below the reservoir while a dose of fluid is being expelled. Such rings generally fulfill two main functions, namely firstly ensuring that a maximum quantity of the fluid contained inside the reservoir can be dispensed, by limiting the dead volume situated below the inlet of the valve when said valve is in its upsidedown working position. Secondly, such rings also serve to limit contact between the fluid and the neck gasket that is generally arranged between the neck of the reservoir and the fastener hoop or capsule that serves to fasten the valve on the receptacle. By limiting contact between the gasket and the fluid contained in the reservoir, the risks of the fluid becoming contaminated by extractables that can be leached from said gasket are limited, and also deterioration of the gasket as a result of its contact with the fluid, in particular a propellant gas, is limited.

In general, the ring is assembled on the valve body by radially clamping an inner edge of the ring onto said valve body. That configuration presents the drawback that when the radial clamping is too strong, it can deform the valve body over time, and in particular the inside of said body, and that can cause the valve to malfunction. Numerous valves provide a relatively narrow gap between the valve member that slides and the valve body. Radial deformation of the valve body can thus cause friction and even jamming of said valve member. In addition, in order to perform the two above-mentioned functions effectively, the ring is generally in contact, via its outer portion, with a portion of the neck of the reservoir, which contact is not necessarily leaktight contact. In particular, when the fastener capsule is a crimpable capsule, the crimping causes the neck of the reservoir to deform radially, thereby increasing the radial compression exerted on the ring. Once again, this increase in the radial compression transmitted to the inner edge of the ring can cause an increase in the stress exerted on the valve body, and can cause said valve body to deform.

Document WO 2007/074274 describes a ring that includes a deformable wall for limiting stress on the valve body, and that also makes it possible to limit contact between the fluid and the neck gasket. The ring makes it possible to solve the above-mentioned problems in part.

Document WO 2012/136927 describes a ring that is made as a single piece including a radial flange that forms a neck gasket, said ring being made out of a material including cyclic olefin copolymer (COC) elastomer. In particular, the ring presents the drawback of being made entirely out of material that is relatively flexible, and this can make it more difficult to manufacture and to assemble. Furthermore COC elastomer is a material that is relatively expensive.

Documents EP 1 065 156, U.S. Pat. No. 5,697,532, FR 2 865 198, FR 2 840 890, FR 2 792 295, WO 2011/012804, JP 2004/202410, and DE 10 2005 002 444 describe other prior-art devices.

An object of the present invention is to provide a ring for a fluid dispenser device that does not have the above-mentioned drawbacks, and that in particular improves the ring of document WO 2012/136927.

More particularly, an object of the present invention is to provide a ring for an aerosol dispenser device that avoids any excessive radial stress on the valve body, thereby avoiding any risk of the valve body deforming excessively, in particular while the valve is being crimped on the reservoir.

Another object of the present invention is to provide such a ring that makes it possible to compensate for dispersion in manufacturing tolerances, without increasing radial stress on the valve body.

Another object of the present invention is to provide such a ring that maximizes the amount of the content of the reservoir that can be dispensed.

Another object of the present invention is to provide such a ring that limits, as much as possible, the interactions with the fluid and the propellant gas contained in the reservoir.

Another object of the present invention is to provide a fluid dispenser device that is simple and inexpensive to manufacture and to assemble, reducing in particular the number of component parts of the fluid dispenser device.

The present invention thus provides a ring for arranging around a valve body of a fluid dispenser valve that is mounted by means of a fastener capsule, such as a crimpable capsule, on a reservoir containing fluid to be dispensed, said ring comprising:

a single piece including at least one inner portion that co-operates with said valve body, a radial flange that forms a neck gasket that extends between the neck of the reservoir and the fastener capsule, and at least one axial recess that extends, at least in part, around the periphery of said ring, radially inwards from said radial flange, said single piece being made out of a first material that is substantially deformable; and at least one filler insert that fills said at least one axial recess at least in part, said at least one filler insert being made out of a second material that is more rigid than said first material, said at least one filler insert being over-molded on said single piece.

Advantageously, said single piece includes a first radially-inner portion that co-operates with a portion of the valve body, and a second inner portion that co-operates with another portion of the valve body.

Advantageously, said first radially-inner portion has a deformable lip.

Advantageously, said single piece includes a single peripheral axial recess.

Advantageously, the ring includes a single filler insert that fills all of said axial recess.

In a variant, said single piece includes a plurality of axial recesses that are separated by radial ribs.

Advantageously, said single piece comprises a copolymer elastomer having a glass transition temperature lying in the range $-10°$ C. to $15°$ C., a crystalline melting point lying in the range $50°$ C. to $120°$ C., a crystallinity by weight lying in the range 5% to 40%, and a norbornene content lying in the range 2 mol % to 15 mol %.

Advantageously, said single piece comprises COC elastomer.

Advantageously, said second material comprises polyamide, polypropylene, and/or polyethylene.

Advantageously, said at least one filler insert is colored in some other way from said single piece.

Advantageously, said at least one axial recess is a through recess, said at least one insert being exposed on the top and bottom axially sides of said single piece.

In a variant, said at least one axial recess is a blind recess, said at least one insert being exposed only on the top axially side of said single piece.

The present invention also provides a fluid dispenser device comprising a reservoir containing fluid to be dispensed and a propellant gas, in particular of the hydrofluoroalkane (HFA) type, and an aerosol valve, including a ring as described above.

Advantageously, said valve body includes at least one opening so as to enable fluid to pass from the reservoir into said valve, said first radially-inner portion being situated at the bottom edge of said opening, in the upsidedown working position, with the valve arranged below said reservoir.

These characteristics and advantages and others of the present invention appear more clearly from the following detailed description, given by way of non-limiting examples, and with reference to the accompanying drawings, and in which.

In the description, the terms "axial", "radial", "top", "bottom", "above", and "below" refer to the longitudinal axis A, and to the upright position of the device shown in FIGS. 1 and 2.

Figure 1:
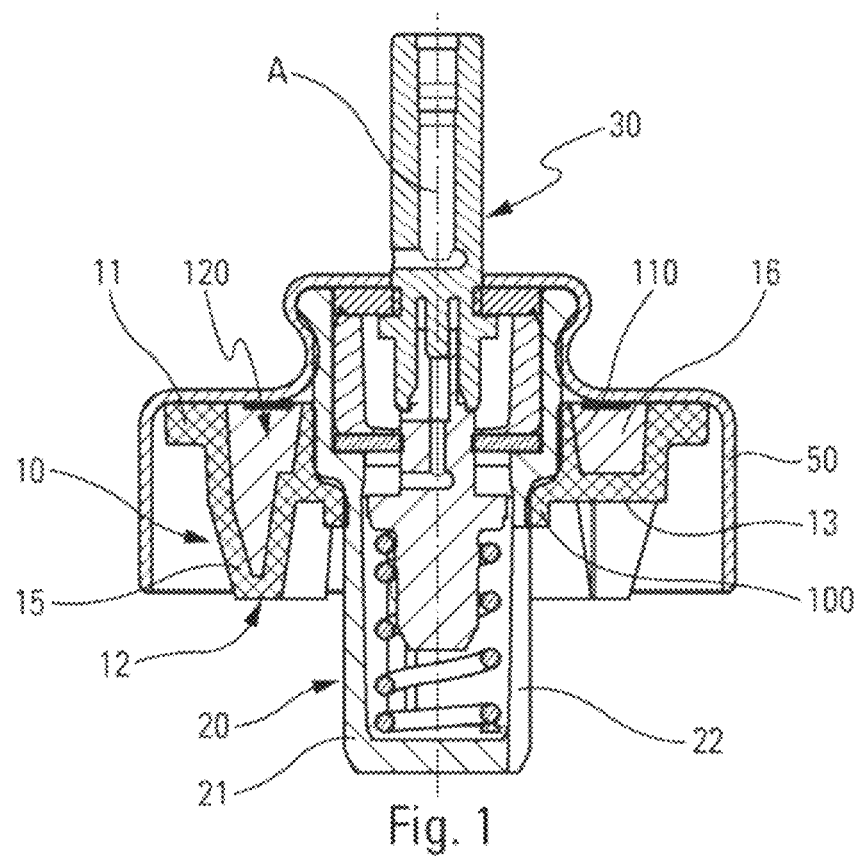
FIG. 1 is a diagrammatic section view of an aerosol dispenser device in its upright position, including a ring constituting a first advantageous embodiment of the present invention.

With reference more particularly to FIG. 1, the aerosol device includes a reservoir (not shown) containing the fluid to be dispensed. In particular, the reservoir may be of the conventional can type, as shown in document WO 2012/136927.

The fluid to be dispensed may be of the pharmaceutical type, and propellant gas, such as a gas of the HFA type, may be provided for dispensing the fluid through an aerosol valve 20, preferably a metering valve.

The aerosol valve includes a valve body 21 in which a valve member 30 slides. The valve body 21 is assembled on the neck of the reservoir by means of a fastener capsule 50, in particular of the crimpable type, with a neck gasket interposed therebetween for sealing purposes. In FIG. 1, the valve is shown in its storage position, which is its upright position, i.e. the valve is situated above the reservoir.

The valve body 21 includes one or more openings 22 making it possible to fill the valve with fluid from the reservoir, in particular by gravity. The openings are shown in FIG. 1 in the form of lateral longitudinal slots 22 that extend over a portion of the height of the valve body 21. In a variant, one or more openings of different shapes could be provided for this purpose, e.g. one or more holes.

Figure 2:
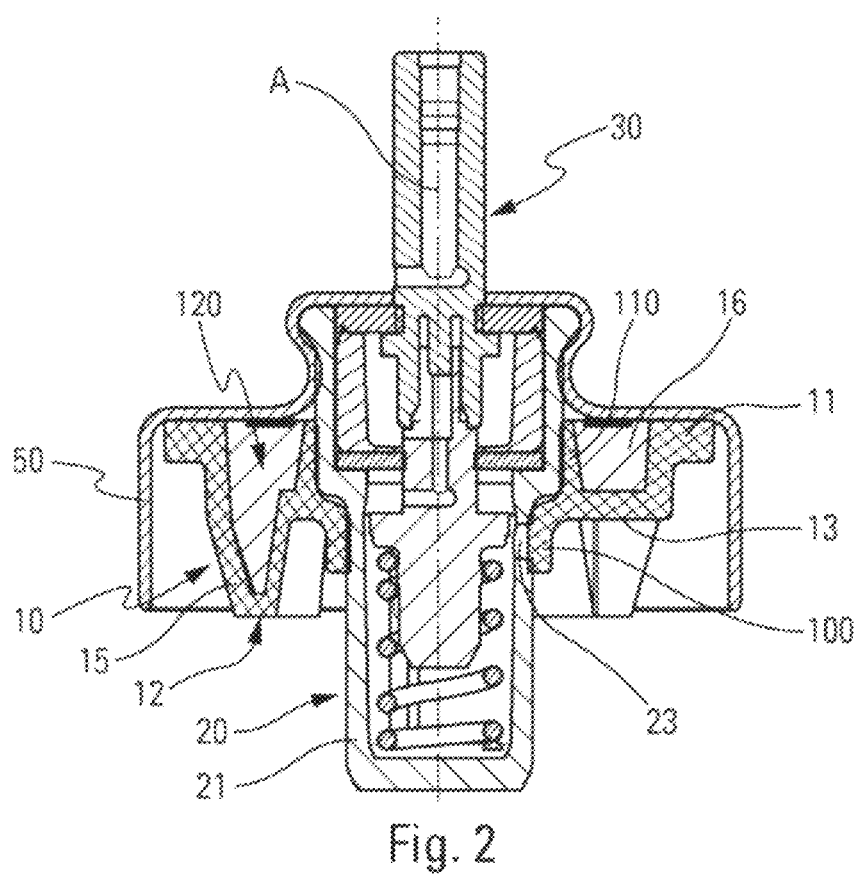
FIG. 2 is a diagrammatic section view of an aerosol dispenser device in its storage position, including a ring constituting another advantageous embodiment of the present invention.

As shown in FIG. 2, the valve body could also include one or more filling openings 23 that are used to fill the reservoir with the fluid through said valve.

A ring 10 is assembled around the valve body 21. The ring 10 is in particular for ensuring that the reservoir is emptied as much as possible by limiting, as much as possible, the dead volume situated below the bottom edge of the opening(s) 22 of the valve body 21 when the valve is in its upsidedown working position.

The ring 10 includes a single piece 15 forming a radial flange 11 that forms the neck gasket that is interposed between the neck of the reservoir and the fastener capsule 50. The invention thus makes it possible to eliminate a part, namely the neck gasket, thereby simplifying the manufacture and the assembly of the device.

An advantage of the neck-gasket-forming radial flange 11 is that, after assembly, the ring 10 cannot slide along the valve body 21, since said radial flange 11 is held between the neck of the reservoir and the capsule 50. Optionally, beads could be formed on the top surface of the neck-gasket-forming radial flange 11, so as to improve the sealing with bottom surface of the capsule 50.

The single piece 15 of the ring 10 includes at least one first radially-inner portion 100 for co-operating with the valve body 21. The first radially-inner portion 100 is preferably the radially-innermost portion of the ring 10. A second inner portion 110 may advantageously be provided to co-operate with another portion of the valve body. This configuration makes it possible to distribute the radial stress exerted by the ring 10 on the valve body 21 over two contact zones instead of one, thereby firstly limiting the radial stress exerted on each of said zones individually, and secondly making it possible to avoid substantially any sliding of the ring 10 on the body 21, said ring being clamped against said body at two distinct locations.

The first radially-inner portion 100 may advantageously comprise a deformable lip that may form a substantially leaktight contact with the valve body 21. Thus, without exerting a high level of radial stress on the valve body, the first inner portion 100 of the ring 10 can co-operate in substantially leaktight manner with said valve body 21.

Advantageously, the first radially-inner portion is situated at the bottom edge of said at least one opening 22, in the upsidedown working position, with the valve arranged below said reservoir.

The ring 10 may include one or more axial projections 12, advantageously three axial projections, that extend towards the inside of the reservoir. The axial projections 12 may be distributed around the periphery and separated by spaces 13.

Figure 4:
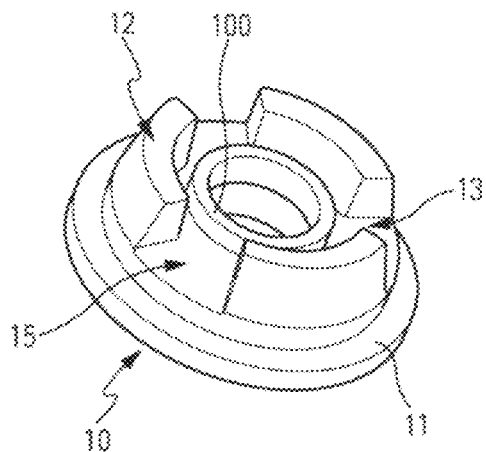
FIG. 4 is a view similar to the view in FIG. 3, as seen from below.

In the embodiment shown in FIG. 4, the axial projections 12 are wider than the spaces 13. However, it should be noted that the width of the spaces 13 may be equal to, or greater than, the width of the axial projections 12.

The single piece 15 of the ring 10 provides sealing as a neck gasket, while being in contact with the fluid contained in the reservoir. The material used to make the single piece 15 should thus present properties that enable it to provide a sealing function, while simultaneously not having harmful interactions with the fluid and/or the propellant gas contained in the reservoir. In particular, a material that is relatively deformable or flexible is recommended.

A material that is particularly suitable for making the single piece 15 of the ring is COC elastomer. Advantageously, COC elastomer forms the only base material, but it is possible to envisage making a COC elastomer alloy with one or more other materials, in particular those listed below.

COC is a copolymer that is formulated with a norbornene ring and polyethylene. Norbornene comes from synthesizing ethylene and a cyclopentadiene.

Conventional COC is a material that is substantially rigid.

COC elastomer is thus a COC with an increased polyethylene content, thereby imparting elastomeric properties to said material.

COC elastomer is thus not a mixture or an alloy of conventional COC with an elastomer material, but a material as such that presents certain properties that are similar to elastomers.

COC elastomer is a material having a glass transition temperature lying in the range −10° C. to 15° C., a crystalline melting point lying in the range 50° C. to 120° C., a crystallinity by weight lying in the range 5% to 40%, and a norbornene content lying in the range 2 mol % to 15 mol %.

The advantages of COC elastomer are numerous.

Firstly, it presents a chemical nature that is very inert since, in contrast to other elastomer materials, it does not include any reactive open or available double bond.

COC elastomer also has a very low level of extractables, i.e. very few particles known as extractables leach out from gaskets made out of COC elastomer, even when the gaskets are in contact with HFA-type propellant gases that are particularly aggressive. In particular, COC elastomer does not present fatty acids as extractables, unlike elastomers and thermoplastic elastomers. Extractables that exist with COC elastomer mainly include antioxidants.

Figure 7:
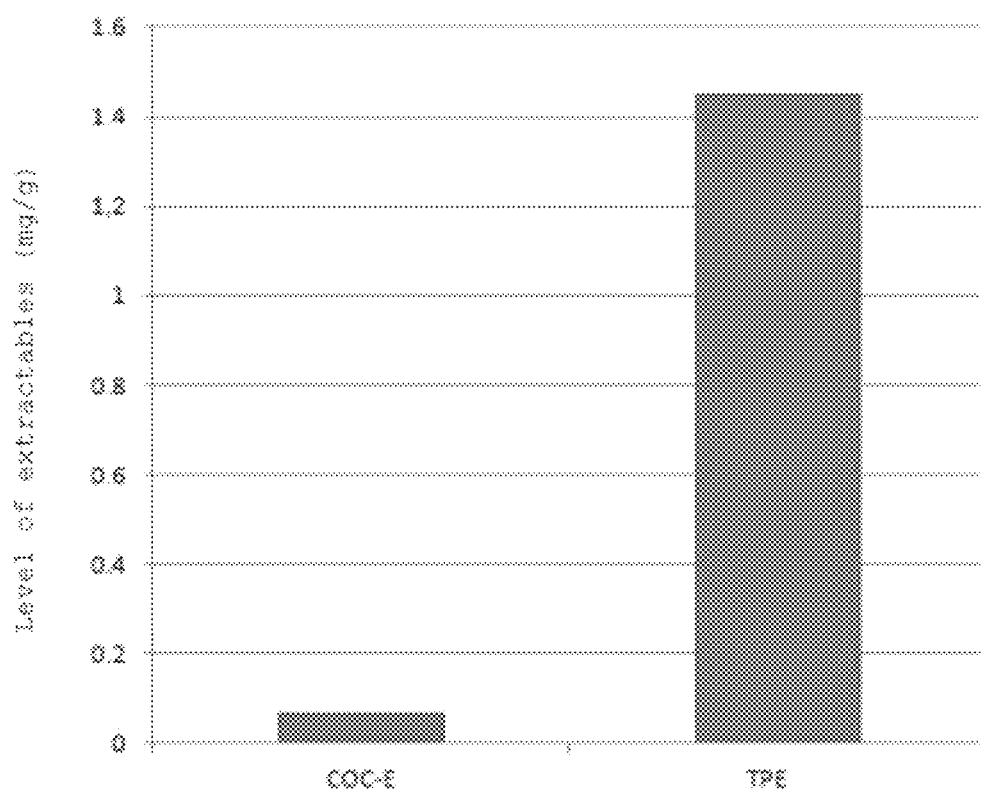
FIG. 7 is a table below showing levels of extractables.

Figure 7 shows that the level of extractables is much less for COC-E than for the thermoplastic elastomer (TPE) that, in this comparative example, comprises a mixture of 50% butyl rubber and 50% polyethylene:

As for elastomer materials, they present levels of extractables that are much greater still, such as, for example, nitrile rubber that has a level of extractables of about 14 milligrams per gram (mg/g), or EPDM that has a level of extractables that lies in the range 1.4 mg/g to 5.3 mg/g.

COC elastomer also presents significant barrier properties against water vapor, and mechanical properties that are entirely suitable for making valve gaskets, in particular its hardness and its Young's modulus. It also presents the ability to withstand abrasion. COC elastomer also presents good compatibility with active substances of the pharmaceutical type since there is no leaching of ions, no trace metals, it includes hydrophobic surfaces so that there is less absorption, and finally it can be designed easily, i.e. it is easy to make parts of any shape from this material.

By way of example and in non-limiting manner, the COC-E 140 product sold by the supplier TOPAS ADVANCED POLYMERS is a material that is suitable for the present invention.

Other materials can also be envisaged for alloying with the COC elastomer, e.g. thermoplastic polyurethane elastomers (TPU). In a variant, it is possible to use an olefin-based thermoplastic polyester elastomer (TPE) material, e.g. a mixture of polypropylene (PP) and styrene-block copolymer (SBC); poly(ethylene octene) (PEO); poly(ethylene butene) (PEB); ethyl vinyl acetate (EVA); a mixture of PP and ethylene propylene diene monomer (EPDM). Other possible materials include: polyolefin; polybutylene terephthalate (PBT); polyoxymethylene (POM); polyamide (PA); polycarbonate (PC); polymethyl methacrylate (PMMA); polyvinyl chloride (PVC); acrylonitrile butadiene styrene (ABS); PP; polyethylene (PE); and alloys of all of these materials. Other possible materials include: thermoplastics alloys (nitrile butadiene rubber (NBR)/PP, butyl/PP, halobutyl/PP, hydrogenated nitrile butadiene rubber (HNBR)/PE); thermoplastic elastomers prepared by dynamic vulcanization; thermoplastic polyamide elastomers (polyether block amide (PEBA), polyesteramide (PEA), polyetheresteramide (PEEA), polycarbonate-esteramide (PCEA)); thermoplastic polyether ester elastomers; styrene-block copolymers (styrene-butadiene-styrene (SBS), styrene-isoprene-styrene (SIS), styrene-ethylene-butylene-styrene (SEBS), styrene-ethylene-propylene-styrene (SEPS), styrene-ethylene-ethylene-propylene-styrene (SEEPS), styrene-isoprene-butadiene-styrene (SIBS)); and mixtures of these materials.

Figure 3:
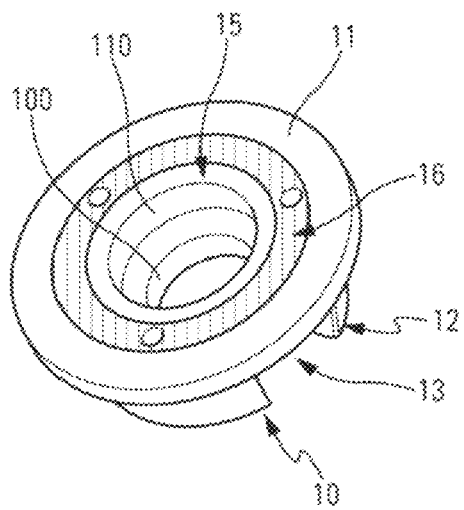
FIG. 3 is a diagrammatic perspective view from above of the FIG. 1 ring.

In order to avoid shrink marks after molding, the single piece 15 of the ring 10 includes one or more axial recesses 120 that extend around the periphery of the ring, radially inwards from the neck-gasket-forming radial flange 11. Preferably, a single peripheral axial recess 120 is provided, as can be seen in FIG. 3. In a variant, a plurality of axial recesses separated by radial ribs could be provided.

The axial recess 120 may open only on one side of the single piece 15, in particular its top axial side, forming a blind axial recess, as shown in FIGS. 1 to 4.

Figure 5:
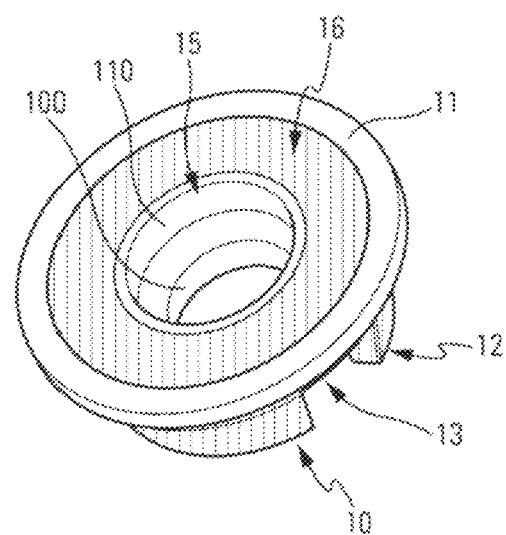
FIG. 5 is a view similar to the view in FIG. 3, showing another embodiment of the ring, as seen from above.
Figure 6:
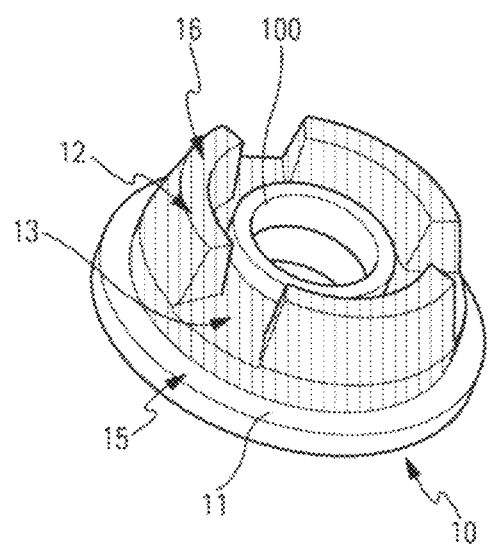
FIG. 6 is a view similar to the view in 30 FIG. 5, as seen from below.

In a variant, the axial recess may be a through recess, and opens on both the top axial side and the bottom axial side of the single piece 15, as shown in FIGS. 5 and 6.

The presence of the axial recess 120 may pose problems as a result of the flexibility of the material that is used to make the single piece 15.

In the invention, said at least one axial recess 120 is filled, at least in part, by at least one filler insert 16 that is made out of a material that is more rigid than said material of said single piece 15.

In the embodiments in the figures, a single insert 16 fills all of the single peripheral axial recess 120.

As can be seen in FIGS. 1 and 2, the axial recess 120 may have various axial depths, in particular at said axial projections 12.

In the invention, the insert 16 is over-molded on said single piece 15. Advantageously, the insert may be made out of polypropylene, polyamide, and/or polyethylene.

In the embodiment in FIGS. 1 to 4, with an insert 16 exposed only on the top side of the single piece 15, said insert 16 is thus not in direct contact with the fluid contained in the reservoir. It is thus advantageous to make the insert 16 out of a material that is inexpensive and easy to over-mold, such as polypropylene and/or polyethylene. In this variant, the axial projections 12 and the spaces 13 of the ring are formed by the single piece 15.

In the embodiment in FIGS. 5 and 6, with an insert 16 passing through the single piece 15, said insert 16 is thus exposed on both sides of said single piece, being in contact with the fluid contained in the reservoir. It is thus advantageous to make the insert 16 out of a material that presents moisture absorbing properties, such as polyamide. In this variant, the axial projections 12 and the spaces 13 of the ring are formed by the insert 16.

FIG. 2 shows a second embodiment, in which said first radially-inner portion 100 includes a deformable lip that co-operates with a filling opening 23 of the valve body 21. This makes it possible to form a check valve that opens during filling.

The advantages of the present invention are numerous.

Thus, the possibility of combining two different materials makes it possible to assign specific functions to each material.

The use of a material that is substantially flexible or "soft", such as the COC elastomer, makes it possible to make a ring that forms a neck gasket flag, thereby making it possible to have one part fewer and one assembly step fewer.

The COC elastomer ensures that the ring is held more securely on the valve body, in particular during transport and/or before crimping the valve on the reservoir.

The use of a substantially-flexible material also makes it possible to create a deformable portion that assists in filling, with the lip providing a check-valve function.

The use of a filler material that is more rigid than the COC elastomer makes it possible to form a ring that is more rigid. In particular, this makes it easier to handle during assembly, and makes it more leaktight.

An insert comprising polyamide (or other materials having similar properties) makes it possible to achieve moisture absorption.

The coloring of the filler material may make it possible to recognize a valve visually as a function of the color of the ring.

Furthermore, a ring with the recesses filled prevents formulation from becoming trapped in the ring, thereby making it possible, advantageously, to reduce the amount of formulation that is lost.

The invention is also advantageous for manufacturing the ring, in particular its molding, in particular by a gain in cycle time.

The invention also makes it possible to save on the cost of the material, by using a filler material that is less expensive than COC elastomer.

Furthermore, the ring of the invention presents less deformation and thus a better size and shape.

Although the present invention is described above with reference to embodiments thereof, as shown in the drawings, the invention is naturally not limited to those variants, but, on the contrary, any useful modifications could be applied thereto by the person skilled in the art. In particular, the valve could be of any structure. In addition, the shapes of the valve body and of the openings could be different from the shapes shown. The same applies to the capsule or fastener hoop that could be made differently, e.g. by snap-fastening or screw-fastening. In general, any modification is possible without going beyond the ambit of the present invention as defined by the accompanying claims.

The invention claimed is:

1. A ring for arranging around a valve body of a fluid dispenser valve that is mounted by means of a fastener capsule on a reservoir containing fluid to be dispensed, said ring comprises:
a single piece including at least one inner portion that co-operates with said valve body, a radial flange that forms a neck gasket that extends between a neck of the reservoir and the fastener capsule, and a plurality of axial recesses that are separated by radial ribs and that extend, at least in part, around a periphery of said ring, radially inwards from said radial flange, said single piece being made out of a first material that is substantially deformable; and
at least one filler insert that fills at least one of said plurality of axial recesses at least in part, said at least one filler insert being made out of a second material that is more rigid than said first material, said at least one filler insert being over-molded on said single piece.

2. A ring according to claim 1, wherein said single piece includes a first radially-inner portion that co-operates with a portion of the valve body, and a second inner portion that co-operates with another portion of the valve body.

3. A ring according to claim 2, wherein said first radially-inner portion has a deformable lip.

4. A ring according to claim 1, wherein said second material comprises polyamide, polypropylene, and/or polyethylene.

5. A ring according to claim 1, wherein said at least one filler insert is colored in some other way from said single piece.

6. A ring according to claim 1, wherein at least one of said plurality of axial recesses is a through recess, said at least one filler insert being exposed on a top and bottom axial sides of said single piece.

7. A ring according to claim 1, wherein at least one of said plurality of axial recesses is a blind recess, said at least one filler insert being exposed only on a top axial side of said single piece.

8. The ring according to claim 1, wherein the fastener capsule is a crimpable capsule.

9. The ring according to claim 1, including a filler insert that said axial recesses.

10. A ring for arranging around a valve body of a fluid dispenser valve that is mounted by a fastener capsule on a reservoir containing fluid to be dispensed, said ring comprises:
a single piece including at least one inner portion that co-operates with said valve body, a radial flange that forms a neck gasket that extends between a neck of the reservoir and the fastener capsule, and at least one axial recess that extends, at least in part, around a periphery of said ring, radially inwards from said radial flange, said single piece being made out of a first material that is substantially deformable; and
at least one filler insert that fills said at least one axial recess at least in part, said at least one filler insert being made out of a second material that is more rigid than said first material, said at least one filler insert being over-molded on said single piece; and
wherein said single piece comprises a copolymer elastomer having a glass transition temperature lying in the range −10° C. to 15° C., a crystalline melting point lying in the range 50° C. to 120° C., a crystallinity by weight lying in the range 5% to 40%, and a norbornene content lying in the range 2 mol % to 15 mol %.

11. A ring according to claim 10, wherein said single piece includes a single peripheral axial recess.

12. A ring according to claim 11, including a single filler insert that fills all of said axial recess.

13. A ring according to claim 10, wherein said single piece comprises COC elastomer.

14. A fluid dispenser device comprising a reservoir containing fluid to be dispensed and a propellant gas and an aerosol valve, wherein the device includes a ring for arranging around a valve body of the valve that is mounted by a fastener capsule on the reservoir, said ring comprises:
a single piece including at least one inner portion that co-operates with said valve body, a radial flange that forms a neck gasket that extends between a neck of the reservoir and the fastener capsule, and a plurality of axial recesses that are separated by radial ribs and that extend, at least in part, around a periphery of said ring, radially inwards from said radial flange, said single piece being made out of a first material that is substantially deformable; and
at least one filler insert that fills at least one of said plurality of axial recesses at least in part, said at least one filler insert being made out of a second material that is more rigid than said first material, said at least one filler insert being over-molded on said single piece; and wherein said single piece includes a first radially-inner portion that co-operates with a portion of the valve body, and a second inner portion that co-operates with another portion of the valve body; and said valve body includes at least one opening so as to enable fluid to pass from the reservoir into said valve, said first radially-inner portion being situated at the bottom edge of said opening, in the upside-down working position, with the valve arranged below said reservoir.

15. The device according to claim 14, wherein in the propellant gas is and HFA type gas.

16. The device according to claim 14, wherein said second material comprises polyamide, polypropylene, and/or polyethylene.

17. The device according to claim 14, wherein said at least one filler insert is colored in some other way from said single piece.

18. The device according to claim 14, wherein said single piece comprises COC elastomer.

* * * * *